(12) United States Patent
Wei et al.

(10) Patent No.: US 11,931,900 B2
(45) Date of Patent: Mar. 19, 2024

(54) METHOD OF PREDICTING OCCUPANCY OF UNSEEN AREAS FOR PATH PLANNING, ASSOCIATED DEVICE, AND NETWORK TRAINING METHOD

(71) Applicant: SAMSUNG ELECTRONICS CO., LTD., Suwon-si (KR)

(72) Inventors: Minghan Wei, Minneapolis, MN (US); Dae Won Lee, Princeton, NJ (US); Ibrahim Volkan Isler, Saint Paul, MN (US); Daniel Dongyuel Lee, Tenafly, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 655 days.

(21) Appl. No.: 17/131,194

(22) Filed: Dec. 22, 2020

(65) Prior Publication Data
US 2022/0024034 A1  Jan. 27, 2022

Related U.S. Application Data

(60) Provisional application No. 63/056,419, filed on Jul. 24, 2020.

(51) Int. Cl.
*G05D 1/02* (2020.01)
*B25J 9/16* (2006.01)
(Continued)

(52) U.S. Cl.
CPC .......... *B25J 9/1664* (2013.01); *G05D 1/0221* (2013.01); *G06F 17/18* (2013.01);
(Continued)

(58) Field of Classification Search
CPC ... B25J 9/1664; G05D 1/0221; G05D 1/0251; G05D 1/0274; G06F 17/18; G06N 3/045; G06N 3/08; G06N 3/006; G06N 3/088; G06N 3/0464; G06N 3/0455; G06T 17/00; G06T 5/005; G06T 2207/20084;
(Continued)

(56) References Cited

U.S. PATENT DOCUMENTS 10,093,021 B2   10/2018   Aghamohammadi et al.
2015/0003683 A1*  1/2015   Grewe ................... G06V 20/56
                                                        382/104
(Continued)

*Primary Examiner* — Abby Y Lin
*Assistant Examiner* — Dylan M Katz
(74) *Attorney, Agent, or Firm* — Sughrue Mion, PLLC

(57) ABSTRACT

A method of predicting occupancy of unseen areas in a region of interest (ROI) includes obtaining a depth image of the ROI, the depth image being captured from a first height; generating an occupancy map based on the obtained depth image, the occupancy map comprising an array of cells corresponding to locations in the ROI; and generating an inpainted map by inputting the occupancy map into a trained inpainting network, the inpainted map comprising an array of cells corresponding to the ROI, and wherein the inpainting network is trained by comparing an output of the inpainting network, based on inputting a training depth image taken from the first height, to a ground truth map, the ground truth map being based on a combination of the training depth image and a depth image taken at a height different than the first height.

22 Claims, 8 Drawing Sheets

(51) Int. Cl.
*G05D 1/00* (2006.01)
*G06F 17/18* (2006.01)
*G06N 3/045* (2023.01)
*G06N 3/08* (2023.01)
*G06T 17/00* (2006.01)
*G06V 10/25* (2022.01)

(52) U.S. Cl.
CPC ............... *G06N 3/045* (2023.01); *G06N 3/08* (2013.01); *G06T 17/00* (2013.01); *G06V 10/25* (2022.01)

(58) Field of Classification Search
CPC . G06T 2207/20081; G06T 2207/10028; G06T 2207/20221; G06T 19/20; G06T 5/001; G06V 10/25; G06V 10/774; G06V 10/82; G06V 20/52; G06V 20/653; G06V 10/454
See application file for complete search history.

(56) References Cited

U.S. PATENT DOCUMENTS

| | | | | |
|---|---|---|---|---|
| 2015/0331111 | A1* | 11/2015 | Newman | G01S 7/4808 356/4.01 |
| 2019/0294889 | A1* | 9/2019 | Sriram | G06F 18/24143 |
| 2020/0361083 | A1* | 11/2020 | Mousavian | B25J 9/1612 |
| 2020/0377108 | A1* | 12/2020 | Balazs | G06F 18/251 |
| 2023/0266473 | A1* | 8/2023 | Loot | G01S 17/931 356/21 |

* cited by examiner

METHOD OF PREDICTING OCCUPANCY OF UNSEEN AREAS FOR PATH PLANNING, ASSOCIATED DEVICE, AND NETWORK TRAINING METHOD

CROSS-REFERENCE TO RELATED APPLICATION(S)

This application is based on and claims priority under 35 U.S.C. § 119 to U.S. Provisional Patent Application No. 63/056,419, filed on Jul. 24, 2020, in the U.S. Patent & Trademark Office, the disclosure of which is incorporated by reference herein in its entirety.

BACKGROUND

1. Field

The disclosure relates to path planning for autonomously controlled devices, and more particularly to predicting occupancy of unseen areas for path planning.

2. Description of Related Art

Path planning for mobile robots, either offline or online, has been extensively studied. In offline cases where a prior map is available, paths can be optimized for various objectives such as length or time using traditional algorithms such as Dijkstra's or A*. When a prior map is not available, robots must plan paths in an online fashion as they explore their environments using sensors.

Online planning using only on-board sensors is challenging. Humans can navigate in indoor spaces easily with rich visual information provided from the eyes. As sensors, the eyes have a large foot print because they are located at about 1.5-2 m above the ground and, coupled with head rotations, they have a large field of view. Replicating this footprint size on a mobile robot is difficult because stably placing a camera high-above the ground requires a large base. Actuators required to rotate the camera add to the weight and increase system complexity. Therefore, a small mobile robot such as vacuum cleaner is limited to cameras near the ground level. This configuration, coupled with occlusions from obstacles, severely limits the information available for navigation. One possible approach to overcome this difficulty is to place sensors in the environment. Even when it is possible to place such sensors, there are several disadvantages of this alternative such as installation inconvenience, system complexity, and extra cost.

SUMMARY

One embodiment provides a method of training an inpainting network to predict occupancy of unseen areas in a region of interest (ROI), and an associated device.

Another embodiment provides a method of predicting occupancy of unseen areas in a ROI, and an associated device.

Yet another embodiment provides a method of path planning and navigating to a goal position, and an associated device.

According to an aspect of the disclosure, a method of training an inpainting network to predict occupancy of unseen areas in a ROI may include obtaining an upper depth image of the ROI from an upper 3-dinensional (3D) mapping sensor positioned at a first height and a lower depth image of the ROI from a lower 3D mapping sensor positioned at a second height lower than the first height; generating an upper occupancy map based on the upper depth image and a lower occupancy map based on the lower depth image; generating a ground truth map by combining the upper occupancy map and the lower occupancy map; generating an inpainted map by inputting the lower occupancy map into the inpainting network; and training the inpainting network by comparing the inpainted map to the ground truth map.

According to another aspect of the disclosure, a method of predicting occupancy of unseen areas in a ROI may include obtaining a depth image of the ROI, the depth image being captured from a first height; generating an occupancy map based on the obtained depth image, the occupancy map comprising an array of cells corresponding to locations in the ROI, each cell having an occupancy score; and generating an inpainted map by inputting the occupancy map into a trained inpainting network, the inpainted map comprising an array of cells corresponding to the ROI, each cell having an occupancy score. The inpainting network may be trained by comparing an output of the inpainting network, based on inputting a training depth image taken from the first height, to a ground truth map, the ground truth map being based on a combination of the training depth image and a depth image taken at a height different than the first height.

According to another aspect of the disclosure, a method of path planning and navigating to a goal position may include capturing a depth image of a ROI from a first height; generating an occupancy map corresponding to the ROI based on the captured depth image; generating an inpainted map by inputting the occupancy map into a trained inpainting network; updating a global map based on the inpainted map; planning a path to the goal position based on the updated global map; and traveling to the goal position based on the planned path.

According to another aspect of the disclosure, A device for training an inpainting network to predict occupancy of unseen areas in a ROI may include a memory configured to store instructions; and a processor configured to execute the instructions to: obtain an upper depth image of the ROI from an upper 3D mapping sensor positioned at a first height and a lower depth image of the ROI from a lower 3D mapping sensor positioned at a second height lower than the first height; generate an upper occupancy map based on the upper depth image and a lower occupancy map based on the lower depth image; generate a ground truth map by combining the upper occupancy map and the lower occupancy map; generate an inpainted map by inputting the lower occupancy map into the inpainting network; and train the inpainting network by comparing the inpainted map to the ground truth map.

According to another aspect of the disclosure, a device for predicting occupancy of unseen areas in a ROI may include a memory configured to store instructions; and a processor configured to execute the instructions to: obtain a depth image of the ROI, the depth image being captured from a first height; generate an occupancy map based on the obtained depth image, the occupancy map comprising an array of cells corresponding to locations in the ROI, each cell having an occupancy score; and generate an inpainted map by inputting the occupancy map into a trained inpainting network, the inpainted map comprising an array of cells corresponding to the ROI, each cell having an occupancy score. The inpainting network may be trained by comparing an output of the inpainting network, based on inputting a training depth image taken from the first height, to a ground truth map, the ground truth map being based on a combination of the training depth image and a depth image taken at a height different than the first height.

According to another aspect of the disclosure, a device for path planning and navigating to a goal position may include a memory configured to store instructions; and a processor configured to execute the instructions to: capture a depth image of a ROI from a first height; generate an occupancy map corresponding to the ROI based on the captured depth image; generate an inpainted map by inputting the occupancy map into a trained inpainting network; update a global map based on the inpainted map; plan a path to the goal position based on the updated global map; and travel to the goal position based on the planned path.

According to another aspect of the disclosure, a non-transitory computer-readable medium storing instructions, the instructions may include one or more instructions that, when executed by one or more processors of a mobile device, cause the one or more processors to obtain an upper depth image of an ROI from an upper 3D mapping sensor positioned at a first height and a lower depth image of the ROI from a lower 3D mapping sensor positioned at a second height lower than the first height; generate an upper occupancy map based on the upper depth image and a lower occupancy map based on the lower depth image; generate a ground truth map by combining the upper occupancy map and the lower occupancy map; generate an inpainted map by inputting the lower occupancy map into the inpainting network; and train the inpainting network by comparing the inpainted map to the ground truth map.

According to another aspect of the disclosure, a non-transitory computer-readable medium storing instructions, the instructions may include one or more instructions that, when executed by one or more processors of a mobile device, cause the one or more processors to: obtain a depth image of an ROI, the depth image being captured from a first height; generate an occupancy map based on the obtained depth image, the occupancy map comprising an array of cells corresponding to locations in the ROI, each cell having an occupancy score; and generate an inpainted map by inputting the occupancy map into a trained inpainting network, the inpainted map comprising an array of cells corresponding to the ROI, each cell having an occupancy score. The inpainting network may be trained by comparing an output of the inpainting network, based on inputting a training depth image taken from the first height, to a ground truth map, the ground truth map being based on a combination of the training depth image and a depth image taken at a height different than the first height.

According to another aspect of the disclosure, a non-transitory computer-readable medium storing instructions, the instructions may include one or more instructions that, when executed by one or more processors of a mobile device, cause the one or more processors to: capture a depth image of a ROI from a first height; generate an occupancy map corresponding to the ROI based on the captured depth image; generate an inpainted map by inputting the occupancy map into a trained inpainting network; update a global map based on the inpainted map; plan a path to the goal position based on the updated global map; and travel to the goal position based on the planned path.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Figure 1:
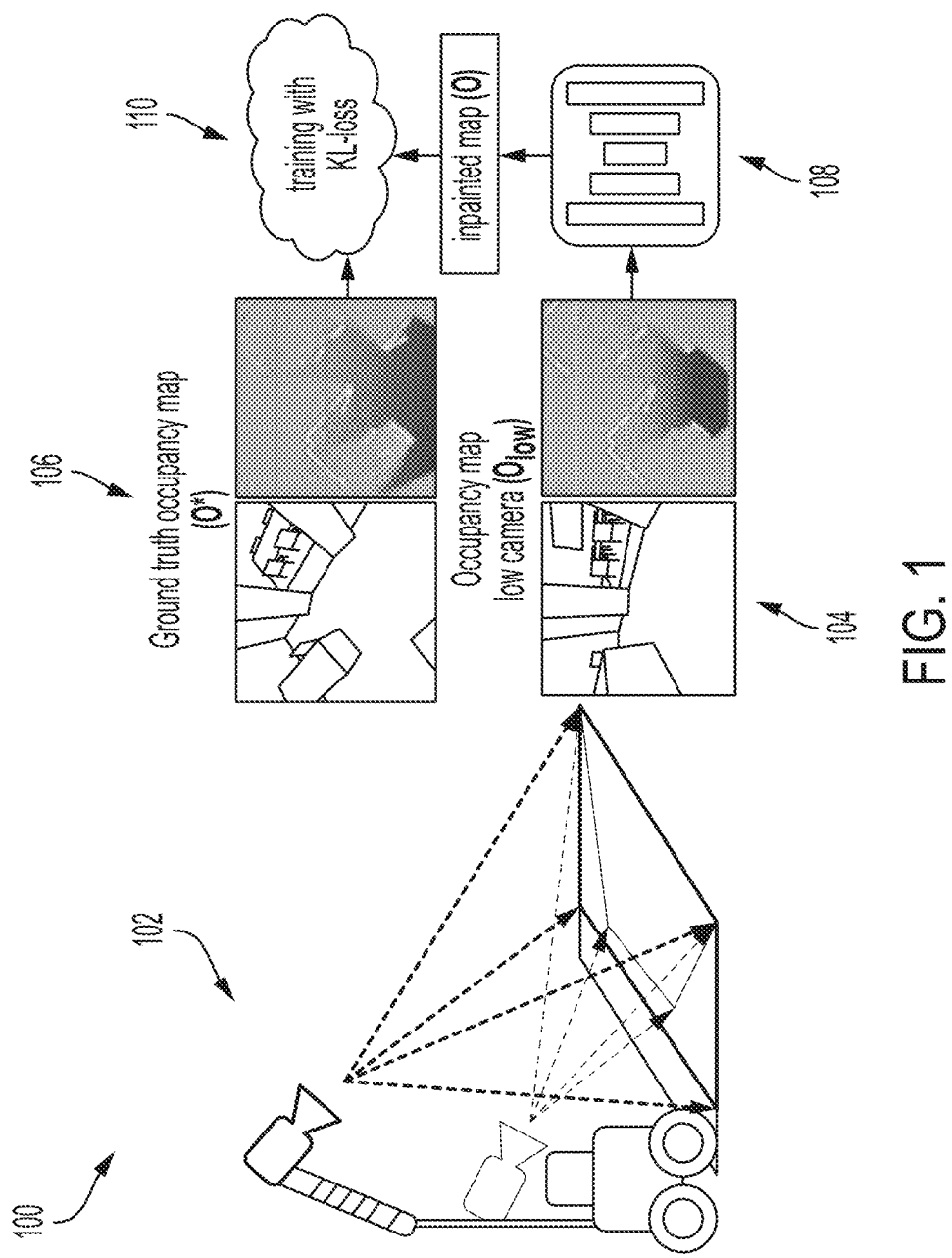
FIG. 1 is diagram of a method of training an inpainting network to predict occupancy of unseen areas in a region of interest according to an embodiment.

FIG. 1 is a diagram of an overview of a method 100 of training an inpainting network to predict occupancy of unseen areas in a region of interest according to an embodiment.

As shown in FIG. 1, at operation 102, a training robot having a high 3D mapping sensor and a low 3D mapping sensor captures depth images of a region of interest (ROI) with each 3D mapping sensor. Due to its higher position, the high 3D mapping sensor has a larger field of view and is able to see above and beyond objects on the ground. As a result, the high 3D mapping sensor produces a more complete images of the ROA than the low 3D mapping sensor.

At operation 104, a lower occupancy map $O_{low}$ and an upper occupancy map $O_{high}$ may be generated from the depth images produced by the respective 3D mapping sensors ($O_{high}$ is not shown in FIG. 1). The occupancy maps may include data related to a probability of an object occupying a cell of the ROI based on a point in the depth image being above the ground plane.

At operation 106, the lower occupancy map $O_{low}$ and the upper occupancy map $O_{high}$ may be combined into a ground truth occupancy map $O^*$. Combining the lower occupancy map $O_{low}$ and the upper occupancy map $O_{high}$ may include accumulating the higher of the occupancies from each map into a single map.

At operation 108, an inpainting network may generate a inpainting map based on an inputted lower occupancy map $O_{low}$. The inpainting network may predict occupancy of unseen or obstructed cells in lower occupancy map $O_{low}$ using machine learning techniques. For example, the inpainting network may be a neural network have encoder-decoder architecture.

At operation 110, the inpainting network may be trained by comparing the inpainted map to the ground truth occupancy map $O^*$. The training may be based on KL-divergence loss between the ground truth occupancy map $O^*$ and the inpainted map.

The above process may be repeated to further teach the inpainting network to predict occupancy of unseen or obstructed cells in the ROI.

Figure 2:
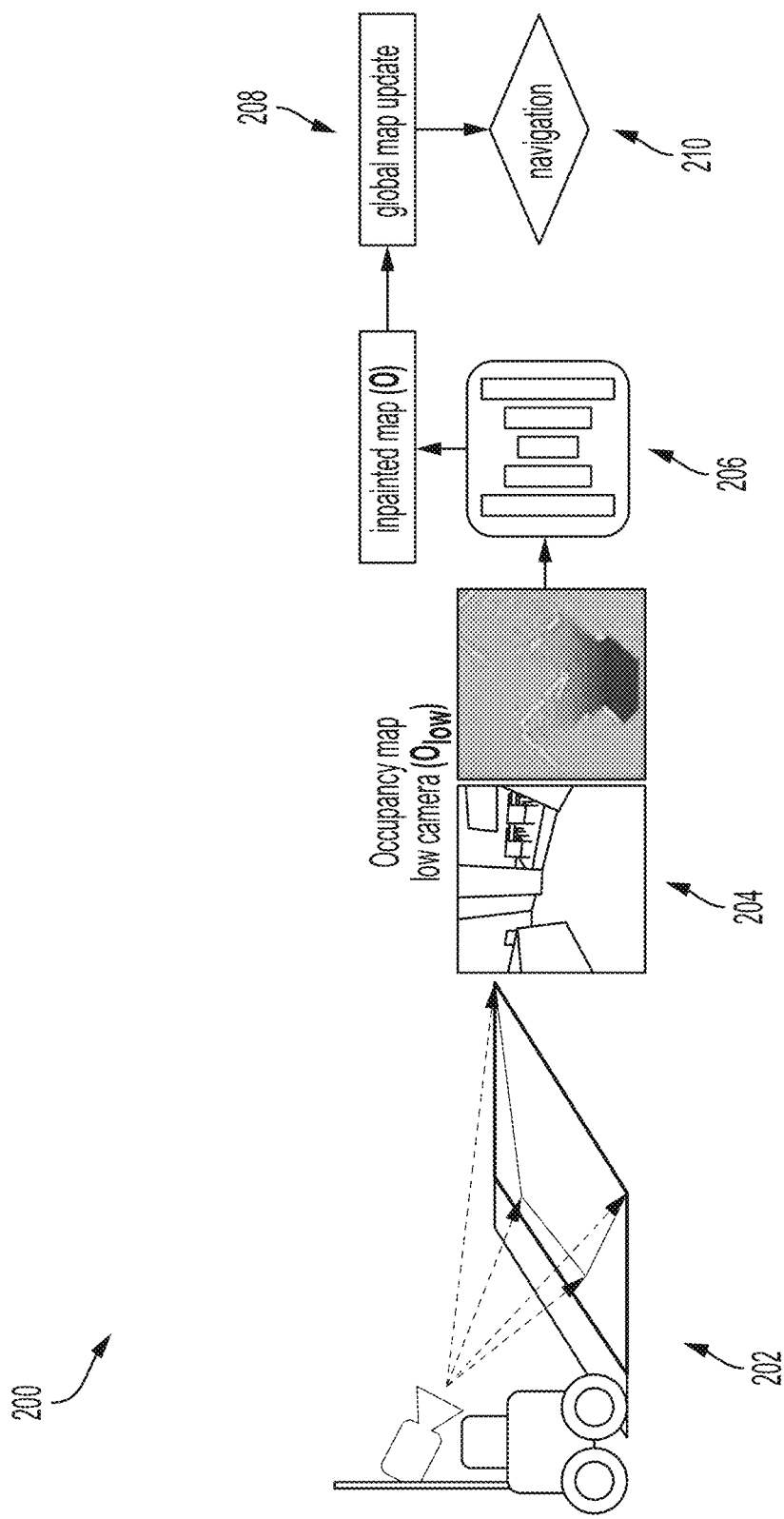
FIG. 2 is a diagram of a method of navigating a robot based on a global map updated by an inpainting network according to an embodiment.

FIG. 2 is a diagram of an overview of a method 200 of navigating a robot based on a global map updated by an inpainting network according to an embodiment.

At operation 202, a navigating robot captures an image of a ROI using a single 3D mapping sensor positioned at a height corresponding to a height of the lower 3D mapping sensor on the training robot.

At operation 204, an occupancy map $O_n$ for the 3D mapping sensor may be generated. The occupancy map $O_n$ may include data related to a probability of an object occupying a cell of the ROI based on a point on the depth image being above the ground plane.

At operation 206, a trained inpainting network may generate an inpainting map based on the occupancy map $O_n$. The inpainting network may predict occupancy of unseen or obstructed cells in the occupancy map $O_n$ using machine learning techniques. The inpainting network may be trained using the training method 100 discussed above.

At operation 208, the occupancies of a global occupancy map may be updated based on the inpainted occupancy map.

At operation 210, a path to a goal location may be planned based on the updated global map and the navigating robot may travel to a goal position based on the planned path.

The global map may be continuously updated as the navigating robot captures additional images as it moves along the planned path. The planned path may be continuously updated each time the global map is updated. Using the updated global map, a more efficient path may be determined. A more efficient path may have decreased length, decreased time, or increased safety. For example, a length of the path to the waypoint may be decreased by predicting the presence of objects in the robots region of interest and planning a route based on the predicted objects.

Figure 3:
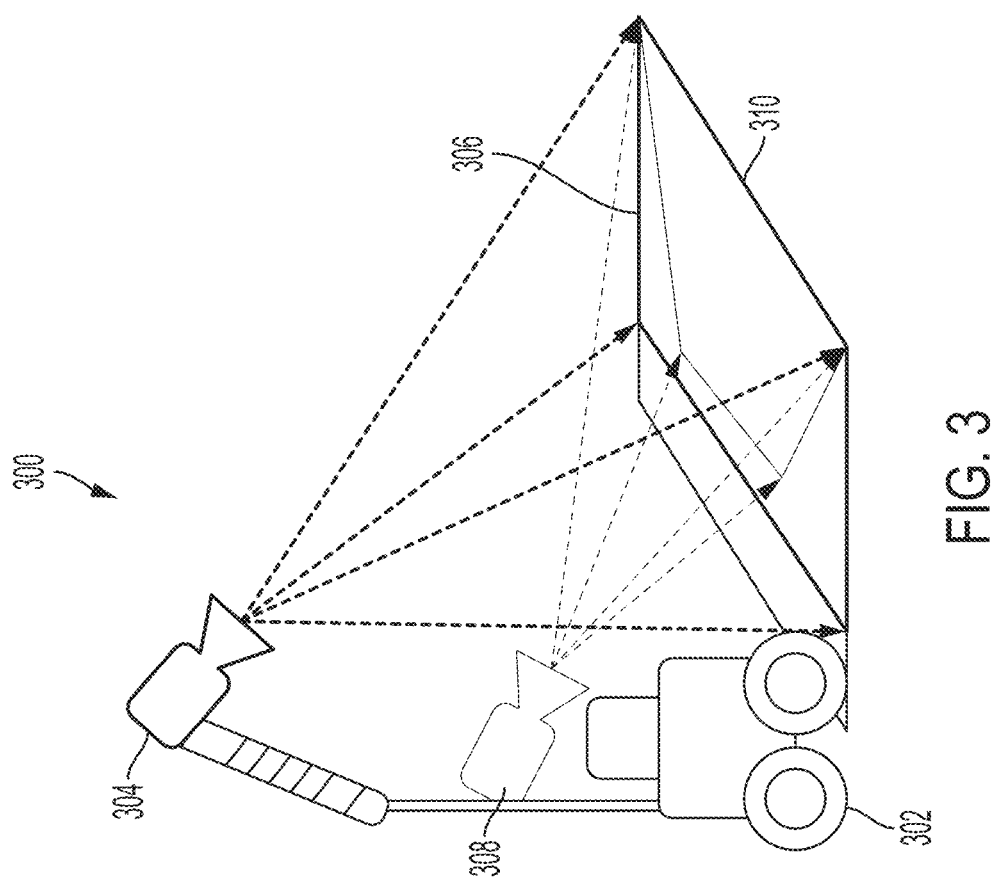
FIG. 3 is profile view of a training robot according to an embodiment.

FIG. 3 shows an example embodiment of a training robot 300 for performing training method 100. The training robot 300 is provided as merely an example and the present training method may be performed by other robots capable of capturing images from two different heights.

As shown in FIG. 3, the training robot 300 may include a traveling unit 302 capable of moving the robot 300 to different locations. The traveling unit 302 may include wheels controlled by motors, as shown in FIG. 3. Alternatively, the traveling unit may use other known methods of locomotion such as articulating legs, rotating tracks, or fans/propellers.

The training robot 300 may include a high 3D mapping sensor 304 positioned at a first height. The high 3D mapping sensor 304 may be directed downwards to provide a field of view 306 in a region in front of the robot 300. In some embodiments, a pose of the high 3D mapping sensor 304 may be varied for adjusting the 3D mapping sensor's field of view 306. In some embodiments, the high 3D mapping sensor 304 may be positioned at a height corresponding to the height of a humans eyes when standing, such as 2 meters (2 m).

The training robot 300 may include a low 3D mapping sensor 308 positioned at a second height that is lower than the first height. The low 3D mapping sensor 308 may be directed downwards to provide a field of view 310 in a region in front of the robot 300. Due to the lower position of the low 3D mapping sensor 308, the field of view 310 may cover a smaller area than the field of view 306 of the high 3D mapping sensor 304. In some embodiments, a pose of the low 3D mapping sensor 308 may be varied for adjusting the 3D mapping sensor's field of view 310. In some embodiments, the low 3D mapping sensor 308 may be positioned at a height corresponding to a height of a 3D mapping sensor on a navigating robot that will be using the inpainting network being trained by the training robot 300. For example, if the 3D mapping sensor on a navigating robot that will be using the inpainting network being trained by the training robot 300 is at a height of 1 foot, the low 3D mapping sensor 308 may be set to a height of 1 foot.

In some embodiments, the training robot 300 may include multiple high 3D mapping sensors directed at different fields of view and multiple low 3D mapping sensors directed at different fields of view. For example, angles of view for each of the high 3D mapping sensors may be offset around a plane perpendicular to the ground to provide a 360 degree view of the environment. The low 3D mapping sensors may be positioned to correspond to the positions of the high 3D mapping sensors at the lower height.

The high and low 3D mapping sensors may capture depth images and/or create a depth map of their field of view. For example, the high and low 3D mapping sensors 304, 308 may be RBG-D 3D mapping sensors. In an embodiment, the depth images may be created by any type of sensor or technique known in the art that is capable of producing depth images, such as Lidar, laser triangulation, radar, stereoscopic imaging, or structure light scanning.

Figure 4:
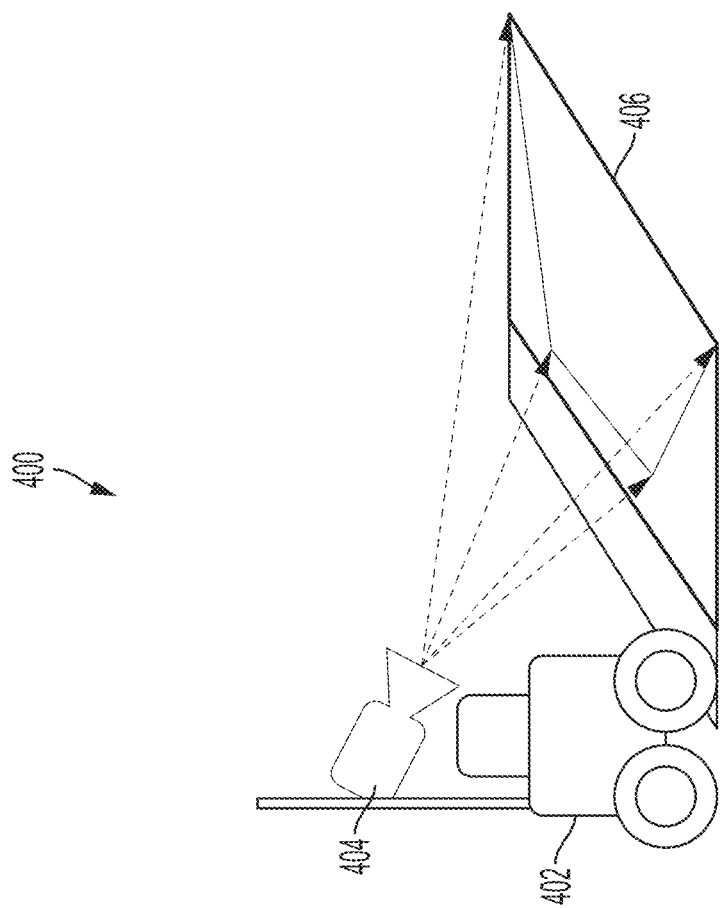
FIG. 4 is a profile view of a navigating robot according to an embodiment.

FIG. 4 shows an example embodiment of a navigating robot 400 for performing navigating method 200. The navigating robot 400 is provided as merely an example and the disclosed navigating method may be performed by other robots capable of capturing depth images.

As shown in FIG. 4, the navigating robot 400 may include a traveling unit 402 capable of moving the robot 400 to different locations. The traveling unit may include wheels controlled by motors, as shown in FIG. 4. Alternatively, the traveling unit may use other known methods of locomotion such as articulating legs, rotating tracks, or fans/propellers.

The navigating robot 400 may include a 3D mapping sensor 404 positioned at height corresponding to a height of the low 3D mapping sensor on a training robot 300 used to train the inpainting network used by the navigating robot 400. For example, if the low 3D mapping sensor 308 on the training robot 300 is positioned at 1 m, the 3D mapping sensor 404 on the navigating robot 400 mat be positioned at 1 m. The 3D mapping sensor 404 may be directed downwards to provide a field of view 406 in a region in front of the robot 400.

In some embodiments, the navigating robot 400 may include multiple 3D mapping sensors directed at different fields of view. For example, angles of view for each of the 3D mapping sensors me be offset around a plane perpendicular to the ground to provide a 360 degree view of the environment.

The 3D mapping sensor 404 may capture depth images and/or creates depth maps of their field of view 406. For example, 3D mapping sensor 404 may be RBG-D camera. In an embodiment, the depth images may be created by any type of sensor or technique known in the art that is capable of producing depth images, such as Lidar, laser triangulation, radar, stereoscopic imaging, or structure light scanning.

Figure 5:
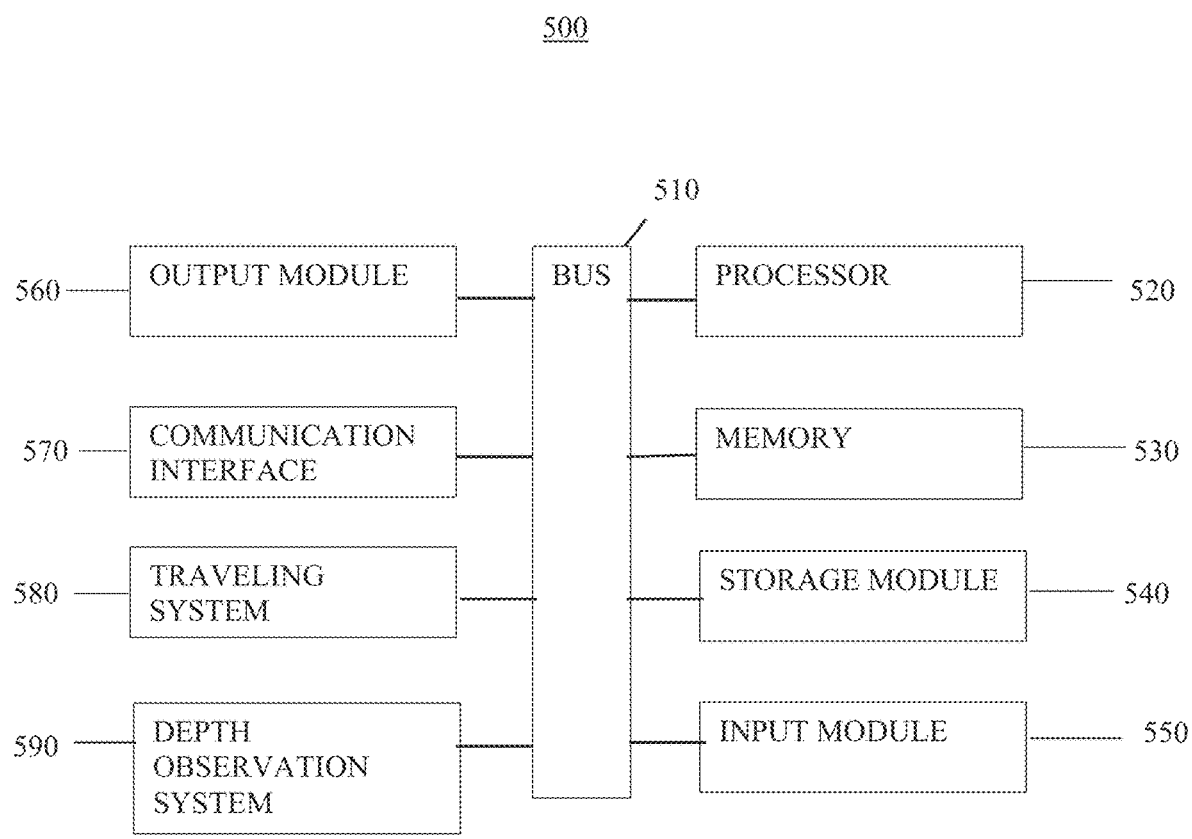
FIG. 5 is a hardware diagram for a robot according to an embodiment.

FIG. 5 is a diagram of example components of a robotic device 500 according to an embodiment. In some embodiments, the training robot 300 and/or the navigating robot 400 may include the components shown in FIG. 5. As shown in FIG. 5, the robotic device 500 may include a bus 510, a processor 520, a memory 530, a storage module 540, an input module 550, an output module 560, a communication interface 570, an traveling system 580, and an depth observation system 590.

The bus 510 may include a component that permits communication among the components of the robotic device 500. The processor 520 may be implemented in hardware, firmware, or a combination of hardware and software. The processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 520 may include one or more processors capable of being programmed to perform a function. The memory 530 may include a random access memory (RAM), a read only memory (ROM), and/or another type of dynamic or static storage device (e.g., a flash memory, a magnetic memory, and/or an optical memory) that stores information and/or instructions for use by the processor 520.

The storage module 540 may store information and/or software related to the operation and use of the robotic device 500. For example, the storage module 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input module 550 may include a component that permits the robotic device 500 to receive information, such as via user input (e.g., a touch screen display, a keyboard, a keypad, a mouse, a button, a switch, and/or a microphone). Additionally, or alternatively, the input module 550 may include a sensor for sensing information (e.g., a global positioning system (GPS) component, an accelerometer, a gyroscope, and/or an actuator). The output module 560 may include a component that provides output information from the robotic device 500 (e.g., a display, a speaker, and/or one or more light-emitting diodes (LEDs)).

The communication interface 570 may include a transceiver-like component (e.g., a transceiver and/or a separate receiver and transmitter) that enables the robotic device 500 to communicate with other devices, such as via a wired connection, a wireless connection, or a combination of wired and wireless connections. The communication interface 570 may permit the robotic device 500 to receive information from another device and/or provide information to another device. For example, the communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

The robotic device 500 may perform one or more processes described herein. The robotic device 500 may perform these processes in response to the processor 520 executing software instructions stored by a non-transitory computer-readable readable medium, such as the memory 530 and/or the storage module 540. A computer-readable medium is defined herein as a non-transitory memory device. A memory device includes memory space within a single physical storage device or memory space spread across multiple physical storage devices.

Software instructions may be read into the memory 530 and/or the storage module 540 from another computer-readable medium or from another device via the communication interface 570. When executed, software instructions stored in the memory 530 and/or the storage module 540 may cause the processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

An traveling system 580 may power movement of the robotic device 500. The traveling system 580 may include one or more motors that operate in response to instructions produced by the processor 520. In some embodiments, the one or more motors may rotate linkages, actuate linear actuators, rotate wheels, and/or rotate propellers of the robotic device 500 to provide locomotion. In some embodiments, the traveling system may include the traveling unit described above.

A depth observation system 590 may detect 3D points of the surrounding environment and may produce 3D depth images based on the detected 3D points. The depth observation system 590 may transmit the detected 3D points or produced depth images to the processor 520 for processing. Examples of depth observation sensors may include depth observation sensors capable of performing the following techniques Lidar, laser triangulation, stereoscopic imaging, or structure light scanning. In some embodiments, the depth observation system may include one or more RGB-D cameras for producing depth images. For example, the depth observation system 590 of the training robot 300 may have upper and lower RGB-D cameras, and the depth observation system 590 of the navigating robot 400 may include an RGB-D camera.

The number and arrangement of components shown in FIG. 5 are provided as an example. In practice, the robotic device 500 may include additional components, fewer components, different components, or differently arranged components than those shown in FIG. 5. Additionally, or alternatively, a set of components (e.g., one or more components) of the robotic device 500 may perform one or more functions described as being performed by another set of components of the robotic device 500.

Figure 6:
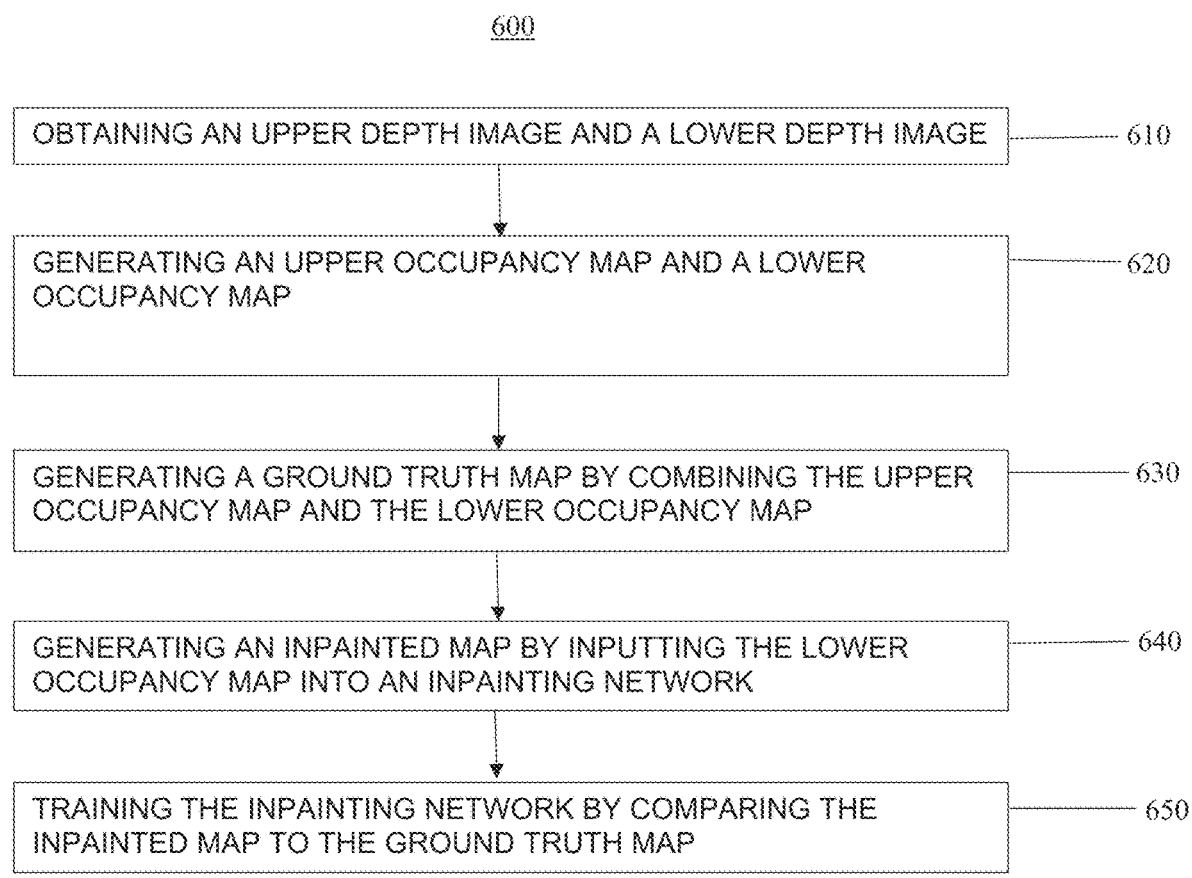
FIG. 6 is a flowchart of a method of training an inpainting network to predict occupancy of unseen areas in a region of interest according to an embodiment.

FIG. 6 is a flowchart of a method 600 of training an inpainting network to predict occupancy of unseen areas in an ROI according to an embodiment. The method 600 of FIG. 6 will be described with relation to the training robot 300 of FIG. 3 for explanatory purposes. However, the method is not limited to the training robot 300 of FIG. 3 and may be performed by other robots capable of capturing images from two different heights.

In operation 610, an upper depth image and a lower depth image may be obtained. The upper depth image may be captured by the high 3D mapping sensor 304 located at a first height, and the lower depth image may be captured by a low 3D mapping sensor 308 located at a second height lower than the first height. Accordingly, the ROI may be imaged from two perspectives, each of which obtains different occupancy information for the cells in the ROI. That is, the depth image captured from the high 3D mapping sensor 304 will have a larger field of view 306 that will likely extend over objects that the low 3D mapping sensor's field of view 310 will not be able to extend over. In some embodiments, the upper depth image and the lower depth image may be simultaneously captured. In other embodiments, the upper depth image and lower depth image may be captured at different times while the training robot 300 and 3D mapping sensors 304, 308 remain in the same position. In come embodiments, a training robot having a single 3D mapping sensor capable of height adjustment may be used to capture the upper depth image and the lower depth image.

As discussed above, the high 3D mapping sensor 304 and the low 3D mapping sensor 308 may be RGB-D cameras. However, the upper and lower 3D mapping sensors 304, 308 may be any known sensors capable of acquiring data necessary for a depth image. In some embodiments, the depth images may be produced using Lidar, laser triangulation, radar, stereoscopic imaging, or structure light scanning.

In operation 620, an upper occupancy map $O_{high}$ may be generated based on the upper depth image and a lower occupancy map $O_{low}$ may be generated based on the lower depth image. The occupancy maps may include a grid of cells that represent the ROI. For example, a 5 meter by 5 meter ROI may be split into a 256×256 grid. The occupancy maps may indicate the probability an object occupies a cells within the ROI.

In a non-limiting embodiment, a log-odd probability p(c) of an object occupying a cell c may be determined based on the 3D data points in the depth image. To determine log-odd probability p(c), the log-odd probability p(c) for each cell may be initially set to zero. Each 3D data point X in each cell is then analyzed, where each pixel value in the depth image represents a data point X. If a data point X is on the ground, a constant value m may be subtracted from the log-odd probability p(c), otherwise the constant value m is added to the log-odd probability p(c). I an example embodiment, m may be set to 0.01. The occupancy map may then include data indicating the calculated log-odd probability p(c) for each cell based on the input depth image.

In operation 630, a ground truth occupancy map may be generated by combining the upper occupancy map $O_{high}$ and the lower occupancy map $O_{low}$. The ground truth map may be an accumulation of the higher of the occupancies from each occupancy map into a single map. In a non-limiting example embodiment, the ground truth occupancy map may be generated based on the following Equation (1).

$$O^* = \max\{\text{abs}(O_{low}), \text{abs}(O_{high})\} \times \text{sign}(O_{low} + O_{high}) \quad (1)$$

In operation 640, an inpainted map may be generated by inputting the lower occupancy map $O_{low}$ into an inpainting network. For cells of the ROI that do not include data because they are not seen by the low 3D mapping sensor, the inpainting network may use machine learning techniques to inpaint probabilities of object occupying the unseen cells. The inpainting network may be a convolutional neural network.

In a non-limiting example embodiment, a U-net based encoder-decoder architecture may be used as the inpainting network. The U-net based encoder-decoder may have an encoder of 5 blocks, where each block has two convolutional layers of kernel size 3×3, followed by a max-pooling layer of size 2×2 except the last block. In each block, an upsampling layer may be followed by two convolutional layers.

Using the above U-net based encoder-decoder, for a 5 m by 5 m occupancy map having a 256×256 grid, the bottleneck layer may have a receptive field of 109×109 which corresponds to an area of around 2 m×2 m. The 2 m×2 m size is selected because it is appropriate for household navigation due to most furniture being within this size range. The size of the receptive field in relation to the size of the input occupancy map may be adjusted based on the environment. For example, an environment having many smaller objects, the network architecture may be adjusted to have a smaller receptive field, and vice versa.

In operation 650, the inpainting network may be trained by comparing the inpainted map to the ground truth occupancy map. In some embodiments, the log-odd probabilities of all cells the ground truth may be scaled to [0,1] to improve network stability and modeling performance, where probability of 0.5 corresponds to log-odd value zero (no occupancy information). In some embodiments, KI-divergence loss between the ground truth map and the inpainted map may be used to train the inpainting network. The KL-divergence between two distribution A(x) and B(x) may be calculated using Equation (2).

$$KL(A\|B) = \sum_{x \in X} A(x) \log\left(\frac{A(x)}{B(x)}\right) \quad (2)$$

As discussed above, the method 600 may be implemented on the training robot 300 or a similar robot. During training, at each timestep, the robot may be moved to a random reachable position and the upper and lower depth images may be captured. The training method 600 process may be repeated for each set of images taken at each timstep.

Figure 7:
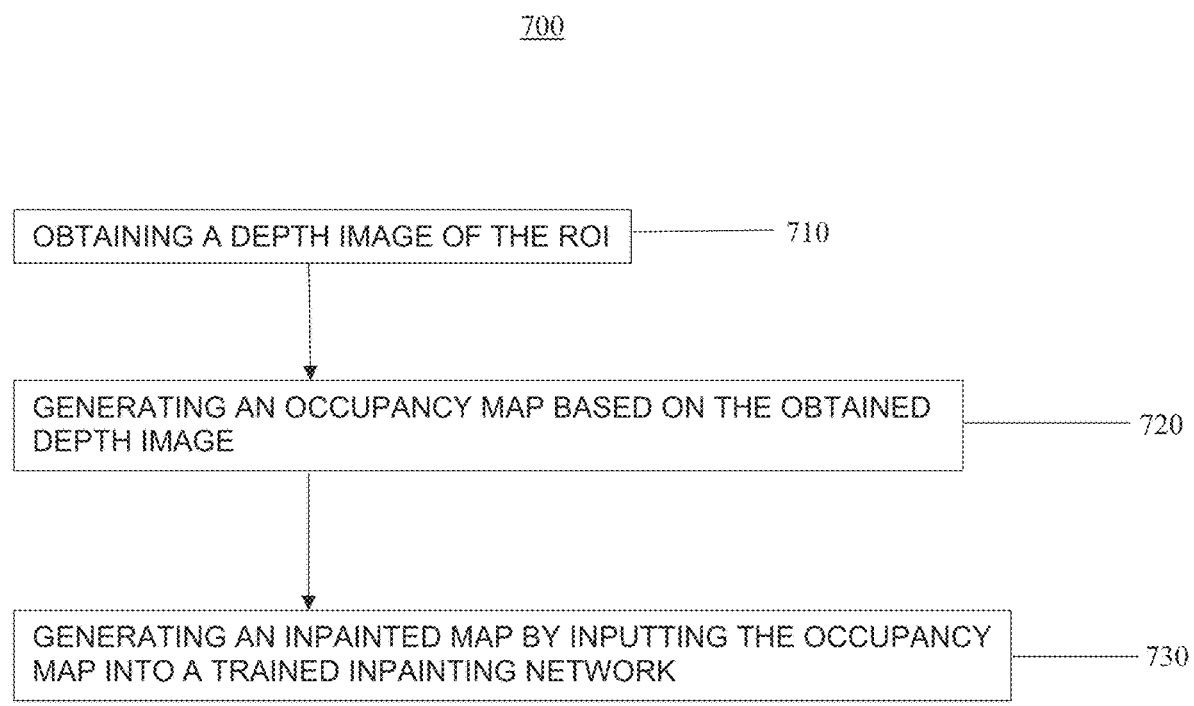
FIG. 7 is a flowchart of a method of predicting occupancy of unseen areas in a region of interest according to an embodiment.

FIG. 7 is a flowchart of a method 700 of predicting occupancy of unseen areas in a ROI according to an embodiment. In some embodiments, the method 700 may be performed by the processor of a navigating robot or by a processor of an external device in communication with the robot such as a server.

In operation 710, a depth image of a ROI may be obtained. The data corresponding to the depth image may be captured from a 3D mapping sensor at a height and orientation that corresponds to a height and an orientation of a low 3D mapping sensor on a training robot that trained an inpainting network used by the method 700. For example, in a scenario where a low 3D mapping sensor of the training robot is at a height of 2 m and an orientation at a an angle 45 degrees downward with respect to a plane of the ground, a 3D mapping sensor capturing the depth image may be at a height of 2 m and an orientation at an angle 45 degrees downward with respect to a plane of the ground.

In operation 720, an occupancy map based on the captured depth image may be generated. The occupancy map may be generated using a similar technique as discussed in operation 620 of training method 600. The occupancy map may include a grid of cell corresponding to locations in the ROI, with each cell having an occupancy score. The occupancy score may represent a probability an object occupies the cell, such as a log-odd probability. The generated occupancy map may have a size and cell structure corresponding to an occupancy map used to train the inpainting network used by the method 700. For example, in a scenario where an inpainting network is trained using an occupancy map having a 256×256 grid of cells that represent a 5 m×5 m ROI, the occupancy map generated by operation 720 may a 256×256 grid of cells that represent a 5 m×5 m ROI.

In operation 730, an inpainting map may be generated by inputting the generated occupancy map into a trained inpainting network. The inpainted map may include a grid of cell corresponding to locations in the ROI, with each cell having an occupancy score. The occupancy score may represent a probability an object occupies the cell, such as a log-odd probability.

The inpainting network may be a convolutional neural network trained using the training method 600 discussed above. The inpainting network may inpaint log-odd probabilities to cells that correspond to cells of the input occupancy map having zero log-odd values (cells that are not seen in the depth image and therefore do not have any probability information). Accordingly, the inpainted map may include inpainted cells that have a non-zero occupancy score in the inpainted map, while having zero occupancy scores in the occupancy map.

Figure 8:
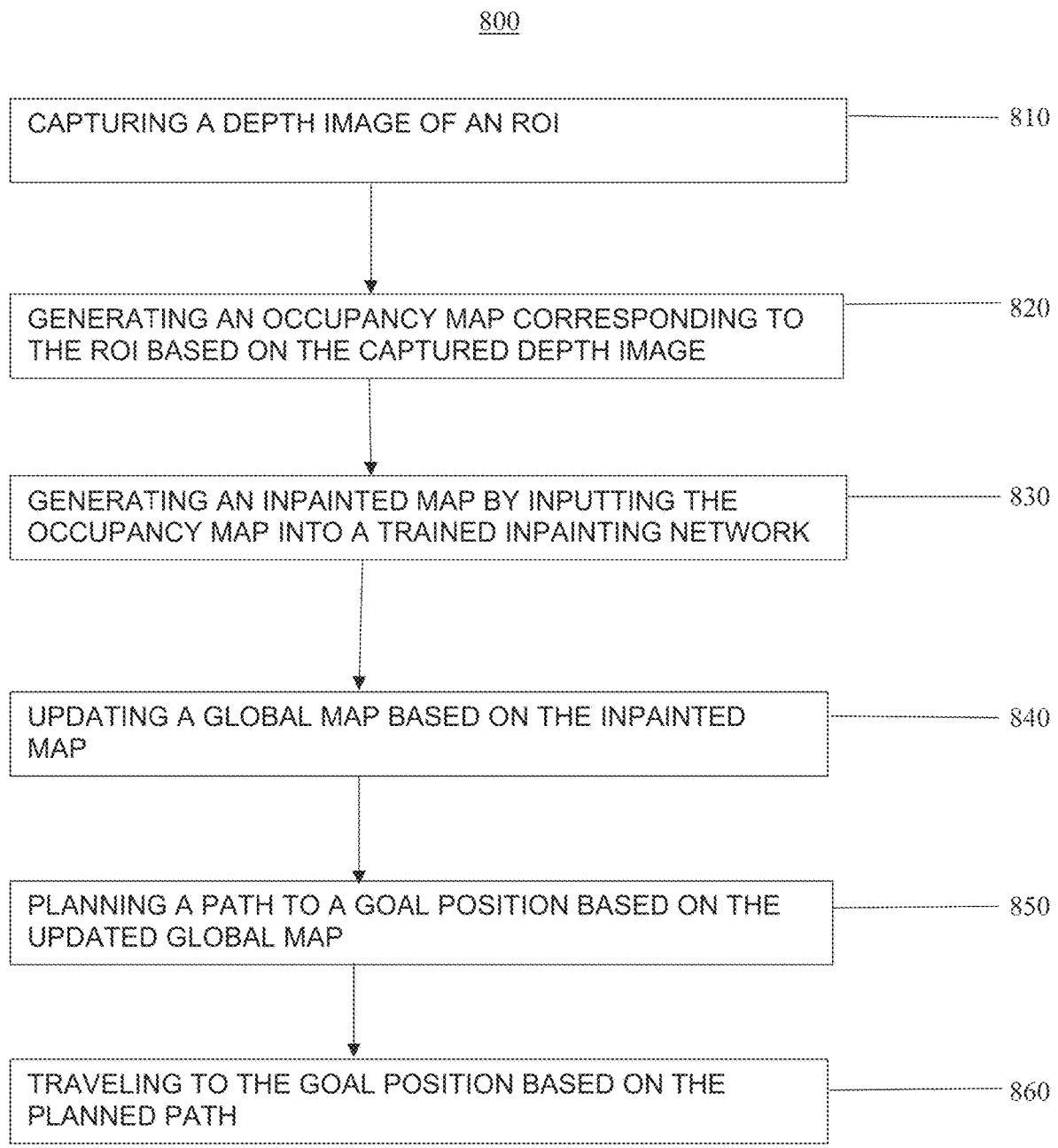
FIG. 8 is a flowchart of a method of path planning and navigating to a goal position according to an embodiment.

FIG. 8 is a flowchart of a method 800 of path planning and navigating to a goal position according to an embodiment. The method will be discussed with relation to the navigating robot 400 for explanatory purposes. However, the method 800 may be performed by similar robots or a robot in communication with an external computer such as a server.

In operation 810, a depth image of an ROI may be obtained. The data corresponding to the depth image may be captured from a 3D mapping sensor 404 at a height and orientation that corresponds to a height and an orientation of a low 3D mapping sensor on a training robot that trained an inpainting network used by the method 800.

In operation 820, an occupancy map based on the captured depth image may be generated. The occupancy map may be generated using a similar technique as discussed in operation 620 of training method 600. The occupancy map may include a grid of cells corresponding to locations in the ROI, with each cell having an occupancy score. The occupancy score may represent a probability an object occupies the cell, such as a log-odd probability. The generated occupancy map may have a size and cell structure corresponding to an occupancy map used to train the inpainting network used by the method 800.

In operation 830, an inpainting map may be generated by inputting the generated occupancy map into the trained inpainting network. The inpainted map may include a grid of cell corresponding to locations in the ROI, with each cell having an occupancy score. The occupancy score may represent a probability that an object occupies the cell, such as a log-odd probability. The inpainting network may be a convolutional neural network trained using the training method 600 discussed above.

In operation 840, a global map may be updated based on the inpainted map. The navigating robot 400 may document its location and direction for determining a pose and position at a given time. A global map of the robot's environment may be updated by comparing the inpainted map to the global map based on the pose and position of the robot. The global map may be updated by adding occupancy scores from the inpainted map to corresponding areas of the global map that do not have occupancy scores.

In operation 850, a path to a goal position may be planned based on the updated global map. In the global map, the cost of visiting a cell may be related to an occupancy probability, and the robot traveling speed is inversely proportional to the occupancy probability. Therefore, the cost of visiting a cell having a high probability of occupancy will be high. Based on the above cost designation, an A* algorithm may be used to plan a path to the goal position using the global map. In some embodiments, other path planning method known in the art may be used, such as Dijkstra algorithms.

In operation 860, the navigating robot 400 may travel to the goal position based on the planned path.

In some embodiments, operations 810 through 850 may be repeated at each timstep. That is, at each timstep, the robot may capture a depth image, generate an occupancy map based on the depth image, generate an inpainted map based on the occupancy map, update the global map based on the inpainted map, and update the planned path based on the updated global map.

For example, at each timestep, the robot may take either of the following actions i. if the next waypoint on the planned path is not in the field of view, the robot rotates to face the waypoint, otherwise ii. the robot follows the planned trajectory for a set distance. After performing one of the two actions i. or ii., the robot may perform operations 810-850. This process may be repeated until the robot reaches the goal position.

The above methods 600, 700, 800 may be applied to any robot that may utilize path planning and is capable of creating a depth image. For example, the method may be applied to mobile household robots such as vacuums or assistants, as well as mobile commercial robots, such as robots that receive and transport objects in a warehouse. Furthermore, the above methods 600, 700, 800 may be applied to path planning for autonomous vehicles such as passenger cars and cargo carrying trucks. Additionally, the above methods may be applied to path planning for articulating arms.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method of training an inpainting network to predict occupancy of unseen areas in a region of interest (ROI), the method comprising:
    obtaining an upper depth image of the ROI from an upper three-dimensional (3D) mapping sensor positioned at a first height and a lower depth image of the ROI from a lower 3D mapping sensor positioned at a second height lower than the first height;
    generating an upper occupancy map based on the upper depth image and a lower occupancy map based on the lower depth image;
    generating a ground truth map by combining the upper occupancy map and the lower occupancy map;
    generating an inpainted map by inputting the lower occupancy map into the inpainting network; and
    training the inpainting network by comparing the inpainted map to the ground truth map,
    wherein the generating the upper occupancy map comprises dividing an area corresponding to the ROI into an array of upper cells and determining upper occupancy scores for the upper cells, the upper occupancy scores indicating probabilities of objects occupying the upper cells,
    wherein the generating the lower occupancy map comprises dividing the area corresponding to the ROI into an array of lower cells and determining lower occupancy scores for the lower cells, the occupancy scores indicating probabilities of objects occupying the lower cells, wherein the determining an upper occupancy score of an upper cell comprises:
        obtaining a 3D data point, in the upper depth image, corresponding to the upper cell.
        adding, based on the 3D data point in the upper depth image being on a ground surface, a constant value to the upper occupancy score; and
        subtracting, based on the 3D data point in the upper depth image not being on the ground surface, the constant value from the upper occupancy score, and
    wherein determining a lower occupancy score of a lower cell comprises:
        obtaining a 3D data point, in the lower depth image, corresponding to the lower cell;
        adding, based on the 3D data point in the lower depth image being on the ground surface, the constant value to the lower occupancy score; and
        subtracting, based on the 3D data point in the lower depth image not being on the ground surface, the constant value from the lower occupancy score.

2. The method of claim 1, wherein generating the ground truth map comprises assigning a cell of the ground truth map to be the greater of:
    an occupancy score of a cell of the upper occupancy map; and
    an occupancy score of a cell of the lower occupancy map that corresponds to a same area as the cell of the upper occupancy map.

3. The method of claim 1, wherein the inpainting network is a convolutional neural network having an encoder-decoder architecture.

4. The method of claim 1, wherein training the inpainting network comprises determining a KL-divergence loss between the ground truth map and the inpainted map.

5. The method of claim 1, wherein the upper depth image and the lower depth image are simultaneously captured.

6. A method of training an inpainting network to predict occupancy of unseen areas in a region of interest (ROI), the method comprising:
    obtaining an upper depth image of the ROI from an upper three-dimensional (3D) mapping sensor positioned at a first height and a lower depth image of the ROI from a lower 3D mapping sensor positioned at a second height lower than the first height
    generating an upper occupancy map based on the upper depth image and a lower occupancy map based on the lower depth image;
    generating a ground truth map by combining the upper occupancy map and the lower occupancy map;
    generating an inpainted map by inputting the lower occupancy map into the inpainting network; and
    training the inpainting network by comparing the inpainted map to the ground truth map,
    wherein the generating the upper occupancy map comprises dividing an area corresponding to the ROI into an array of upper cells and determining upper occupancy scores for the upper cells, the upper occupancy scores indicating probabilities of objects occupying the upper cells,
    wherein the generating the lower occupancy map comprises dividing the area corresponding to the ROI into an array of lower cells and determining lower occupancy scores for the lower cells, the occupancy scores indicating probabilities of objects occupying the lower cells, and
    wherein a size of a state produced by an encoder of the inpainting network that is input into a decoder of the inpainting network is selected based on a size of an object in a training environment.

7. A method of predicting occupancy of unseen areas in a region of interest (ROI) comprising:
    obtaining a depth image of the ROI, the depth image being captured from a first height;
    generating an occupancy map based on the obtained depth image, the occupancy map comprising an array of cells corresponding to locations in the ROI, each cell having an occupancy score; and
    generating an inpainted map by inputting the occupancy map into a trained inpainting network, the inpainted map comprising an array of cells corresponding to the ROI, each cell having an occupancy score, and
    wherein the inpainting network is trained by comparing an output of the inpainting network, based on inputting a training depth image taken from the first height, to a ground truth map, the ground truth map being based on a combination of the training depth image and a depth image taken at a height different than the first height, wherein the generating the occupancy map comprises determining occupancy scores for the cells of the occupancy map, the occupancy scores indicating probabilities of objects occupying the cells, and wherein determining the occupancy score of a cell of the occupancy map comprises:

obtaining a three-dimensional (3D) data point, in the depth image, corresponding to the cell;

adding, based on the 3D data point being on a ground surface, a constant value to the occupancy score; and subtracting, based on the 3D data point not being on the ground surface, the constant value from the occupancy score.

8. The method of claim 7, wherein a cell of the inpainted map having a non-zero occupancy score corresponds to a cell in the occupancy map having an occupancy score of zero.

9. The method of claim 7, wherein the inpainting network is a convolutional neural network having an encoder-decoder architecture.

10. The method of claim 9, wherein a size of a state produced by an encoder of the inpainting network that is input into a decoder of the inpainting network is selected based on a size of an object in a training environment.

11. The method of claim 7, wherein the ground truth map is based on a combination of the training depth image and a depth image taken at a height higher than the first height.

12. A method of path planning and navigating to a goal position comprising:

capturing a depth image of a region of interest (ROI) from a first height;

generating an occupancy map corresponding to the ROI based on the captured depth image;

generating an inpainted map by inputting the occupancy map into a trained inpainting network;

updating a global map based on the inpainted map;

planning a path to the goal position based on the updated global map; and traveling to the goal position based on the planned path, wherein the generating the occupancy map comprises determining occupancy scores for the cells of the occupancy map, the occupancy scores indicating probabilities of objects occupying the cells, and wherein determining an occupancy score of a cell of the occupancy map comprises:

obtaining a three-dimensional (3D) data point, in the depth image, corresponding to the cell;

adding, based on the 3D data point being on a ground surface, a constant value to the occupancy score; and subtracting, based on the 3D data point not being on the ground surface, the constant value from the occupancy score.

13. The method of claim 12, wherein the inpainting network is trained by comparing an output of the inpainting network, based on inputting a training depth image taken from the first height, to a ground truth map, the ground truth map being based on a combination of the training depth image and a depth image taken at a height different than the first height.

14. The method of claim 12, wherein a cell of the inpainted map having a non-zero occupancy score corresponds to a cell in the occupancy map having an occupancy score of zero.

15. The method of claim 12, wherein the inpainting network is a convolutional neural network having an encoder-decoder architecture.

16. The method of claim 15, wherein a size of a state produced by an encoder of the inpainting network that is input into a decoder of the inpainting network is selected based on a size of an object in a training environment.

17. A device for training an inpainting network to predict occupancy of unseen areas in a region of interest (ROI), the device comprising:

a memory configured to store instructions; and a processor configured to execute the instructions to:

obtain an upper depth image of the ROI from an upper three-dimensional (3D) mapping sensor positioned at a first height and a lower depth image of the ROI from a lower 3D mapping sensor positioned at a second height lower than the first height;

generate an upper occupancy map based on the upper depth image and a lower occupancy map based on the lower depth image;

generate a ground truth map by combining the upper occupancy map and the lower occupancy map;

generate an inpainted map by inputting the lower occupancy map into the inpainting network; and train the inpainting network by comparing the inpainted map to the ground truth map, wherein the processor is further configured to:

divide an area corresponding to the ROI into an array of upper cells and determine upper occupancy scores for the upper cells, the upper occupancy scores indicating probabilities of objects occupying the upper cells; and divide the area corresponding to the ROI into an array of lower cells and determine lower occupancy scores for the lower cells, the occupancy scores indicating probabilities of objects occupying the lower cells, and wherein the processor is further configured to:

obtain a 3D data point, in the upper depth image, corresponding to the upper cell;

add based on the 3D data point in the upper depth image being on a ground surface, a constant value to an upper occupancy score;

subtract, based on the 3D data point in the upper depth image not being on the ground surface, the constant value from the upper occupancy score;

obtain a 3D data point, in the lower depth image, corresponding to a lower cell;

add, based on the 3D data point in the lower depth image being on the ground surface, the constant value to a lower occupancy score; and subtract, based on the 3D data point in the lower depth image not being on the ground surface, the constant value from the lower occupancy score.

18. A device for predicting occupancy of unseen areas in a region of interest (ROI), the device comprising:

a memory configured to store instructions; and a processor configured to execute the instructions to:

obtain a depth image of the ROI, the depth image being captured from a first height;

generate an occupancy map based on the obtained depth image, the occupancy map comprising an array of cells corresponding to locations in the ROI, each cell having an occupancy score; and generate an inpainted map by inputting the occupancy map into a trained inpainting network, the inpainted map comprising an array of cells corresponding to the ROI, each cell having an occupancy score, wherein the inpainting network is trained by comparing an output of the inpainting network, based on inputting a training depth image taken from the first height, to a ground truth map, the ground truth map being based on a combination of the training depth image and a depth image taken at a height different than the first height, wherein the processor is further configured to determine occupancy scores for the cells of the occupancy map, the occupancy scores indicating probabilities of objects occupying the cells, and wherein the processor is further configured to:
  obtain a three-dimensional (3D) data point, in the depth image, corresponding to the cell;
  add, based on a 3D data point being on a ground surface, a constant value to the occupancy score; and
  subtract, based on the 3D data point not being on the ground surface, the constant value from the occupancy score.

19. A device for path planning and navigating to a goal position, the device comprising:
  a memory configured to store instructions; and
  a processor configured to execute the instructions to:
    capture a depth image of a region of interest (ROI) from a first height;
    generate an occupancy map corresponding to the ROI based on the captured depth image;
    generate an inpainted map by inputting the occupancy map into a trained inpainting network;
    update a global map based on the inpainted map;
    plan a path to the goal position based on the updated global map; and
    travel to the goal position based on the planned path,
  wherein the processor is further configured to determine occupancy scores for the cells of the occupancy map, the occupancy scores indicating probabilities of objects occupying the cells, and
  wherein the processor is further configured to:
    obtain a three-dimensional (3D) data point, in the depth image, corresponding to the cell;
    add, based on a 3D data point being on a ground surface, a constant value to an occupancy score; and
    subtract, based on the 3D data point not being on the ground surface, the constant value from the occupancy score.

20. A non-transitory computer-readable medium storing instructions, the instructions comprising one or more instructions that, when executed by one or more processors of a mobile device, cause the one or more processors to:
  obtain an upper depth image of a region of interest (ROI) from an upper three-dimensional (3D) mapping sensor positioned at a first height and a lower depth image of the ROI from a lower 3D mapping sensor positioned at a second height lower than the first height;
  generate an upper occupancy map based on the upper depth image and a lower occupancy map based on the lower depth image;
  generate a ground truth map by combining the upper occupancy map and the lower occupancy map;
  generate an inpainted map by inputting the lower occupancy map into the inpainting network; and
  train the inpainting network by comparing the inpainted map to the ground truth map,
  wherein the upper occupancy map is generated by dividing an area corresponding to the ROI into an array of upper cells and determining upper occupancy scores for the upper cells, the upper occupancy scores indicating probabilities of objects occupying the upper cells,
  wherein the lower occupancy map is generated by dividing the area corresponding to the ROI into an array of lower cells and determining lower occupancy scores for the lower cells, the occupancy scores indicating probabilities of objects occupying the lower cells,
  wherein an upper occupancy score of an upper cell is determined by:
    obtaining a three-dimensional (3D) data point, in the upper depth image, corresponding to the upper cell;
    adding, based on the 3D data point in the upper depth image being on a ground surface, a constant value to the upper occupancy score; and
    subtracting, based on the 3D data point in the upper depth image not being on the ground surface, the constant value from the upper occupancy score, and
  wherein determining a lower occupancy score of a lower cell comprises:
    obtaining a 3D data point, in the lower depth image, corresponding to the lower cell;
    adding, based on the 3D data point in the lower depth image being on the ground surface, the constant value to the lower occupancy score; and
    subtracting, based on the 3D data point in the lower depth image not being on the ground surface, the constant value from the lower occupancy score.

21. A non-transitory computer-readable medium storing instructions, the instructions comprising one or more instructions that, when executed by one or more processors of a mobile device, cause the one or more processors to:
  obtain a depth image of a region of interest (ROI), the depth image being captured from a first height;
  generate an occupancy map based on the obtained depth image, the occupancy map comprising an array of cells corresponding to locations in the ROI, each cell having an occupancy score; and
  generate an inpainted map by inputting the occupancy map into a trained inpainting network, the inpainted map comprising an array of cells corresponding to the ROI, each cell having an occupancy score,
  wherein the inpainting network is trained by comparing an output of the inpainting network, based on inputting a training depth image taken from the first height, to a ground truth map, the ground truth map being based on a combination of the training depth image and a depth image taken at a height different than the first height,
  wherein the occupancy map is generated by determining occupancy scores for the cells of the occupancy map, the occupancy scores indicating probabilities of objects occupying the cells, and
  wherein the occupancy score of a cell of the occupancy map is determined by:
    obtaining a three-dimensional (3D) data point, in the depth image, corresponding to the cell;
    adding, based on a 3D data point being on a ground surface, a constant value to the occupancy score; and
    subtracting, based on the 3D data point not being on the ground surface, the constant value from the occupancy score.

22. A non-transitory computer-readable medium storing instructions, the instructions comprising one or more instructions that, when executed by one or more processors of a mobile device, cause the one or more processors to:
  capture a depth image of a region of interest (ROI) from a first height;
  generate an occupancy map corresponding to the ROI based on the captured depth image;
  generate an inpainted map by inputting the occupancy map into a trained inpainting network;
  update a global map based on the inpainted map;

plan a path to a goal position based on the updated global map; and travel to the goal position based on the planned path, wherein the occupancy map is generated by determining occupancy scores for the cells of the occupancy map, the occupancy scores indicating probabilities of objects occupying the cells, and wherein an occupancy score of a cell of the occupancy map is determined by:

obtaining a three-dimensional (3D) data point, in the depth image, corresponding to the cell;

adding, based on a 3D data point being on a ground surface, a constant value to the occupancy score; and subtracting, based on the 3D data point not being on the ground surface, the constant value from the occupancy score.

\* \* \* \* \*